United States Patent
Yeh et al.

(10) Patent No.: US 8,585,929 B2
(45) Date of Patent: Nov. 19, 2013

(54) PHOSPHOR AND METHOD FOR PREPARING THE SAME

(75) Inventors: Chiao-Wen Yeh, Hsinchu (TW); Ru-Shi Liu, Hsinchu (TW)

(73) Assignee: Epistar Corporation, Hsinchu (TW)

( * ) Notice: Subject to any disclaimer, the term of this patent is extended or adjusted under 35 U.S.C. 154(b) by 0 days.

(21) Appl. No.: 13/243,672

(22) Filed: Sep. 23, 2011

(65) Prior Publication Data
US 2013/0075660 A1 Mar. 28, 2013

(51) Int. Cl.
*C09K 11/08* (2006.01)
*C09K 11/66* (2006.01)
(52) U.S. Cl.
USPC ............................................. 252/301.4 F
(58) Field of Classification Search
USPC .............. 252/301.4 F, 301.4 R; 423/326, 331
See application file for complete search history.

(56) References Cited

U.S. PATENT DOCUMENTS

| 2008/0143246 A1* | 6/2008 | Hirosaki et al. ............... 313/503 |
| 2008/0259431 A1* | 10/2008 | Weichmann et al. .......... 359/237 |
| 2010/0200874 A1* | 8/2010 | Shioi et al. ...................... 257/91 |

OTHER PUBLICATIONS

Stadler, 'SrSi6N8—A Reduced Nitridosilicate with a Si-Si Bond', 2005, Angew. Chem. vol. 117, pp. 573-576.*

* cited by examiner

*Primary Examiner* — Emily Le
*Assistant Examiner* — Lynne Edmondson
(74) *Attorney, Agent, or Firm* — Ditthavong, Mori & Steiner, P.C.

(57) ABSTRACT

Disclosed is a phosphor and a method for preparing the same. The phosphor comprises a material having a general composition formula expressed by $M_1Si_6N_{8-X}O_X$ (satisfying $0 \leq x \leq 1$), where M is alkaline earth metal.

18 Claims, 2 Drawing Sheets

PHOSPHOR AND METHOD FOR PREPARING THE SAME

TECHNICAL FIELD

The application relates to a phosphor, in particular to a phosphor devoid of rare earth elements.

DESCRIPTION OF BACKGROUND ART

The light-emitting diode (LED) is known by its high energy efficiency and is introduced to various fields of use. The available lighting product with a light-emitting diode in market provides not only white light but also variable color lights of almost the whole range of the visible wavelength (400 nm~750 nm) and ultraviolet. But a phosphor is usually used to convert the light emitted from an LED to a light with a desired wavelength.

White light can be generated in several ways such as by mixing lights from blue, green, and red chips, exciting phosphor by UV light, or exciting phosphor by blue light. The most common commercial way of generating white light is adopting yttrium aluminum garnet (YAG) phosphor pumped by blue light of an LED to generate a complementary color to be mixed with the blue light to generate white light. For example, a 460 nm blue chip emits blue light to excite YAG:Ce phosphor to generate a 570 nm yellow light, and the blue light is mixed with the yellow light to generate white light.

A phosphor is usually doped with an activator, and the activator is usually selected from rare earth elements such as Ce (Cerium) and Eu (Europium). However, in addition to phosphor, the rare earth elements are widely used in many other fields such as Laser, Hybrid vehicles, Superconductors, and positron emission tomography (PET) scan, and the demand for the rare earth elements gets strong, which restrains the availability of the rare earth elements in the near future.

SUMMARY OF THE DISCLOSURE

A phosphor comprising a material having a general composition formula expressed by $M_1Si_6N_{8-X}Q_X$ (satisfying $0 \leq x \leq 1$), where M is alkaline earth metal.

A method for preparing a phosphor comprising the steps of: providing a powder mixture comprising $Si_3N_4$ and at least one of $M_3N_2$ and MO; and sintering the powder mixture to form the phosphor having a general composition formula expressed by $M_1Si_6N_{8-X}O_X$ (satisfying $0 \leq x \leq 1$), where M is alkaline earth metal.

DETAILED DESCRIPTION OF PREFERRED EMBODIMENTS

The present application provides a phosphor comprising a material having a general composition formula expressed by $M_1Si_6N_{8-X}O_X$ (satisfying $0 \leq x \leq 1$), where M is alkaline earth metal. And the phosphor is devoid of rare earth elements.

First Embodiment

$SrSi_6N_8$ and its Preparation

According to the first embodiment of the present application, a phosphor of $SrSi_6N_8$ is provided.

Figure 1:
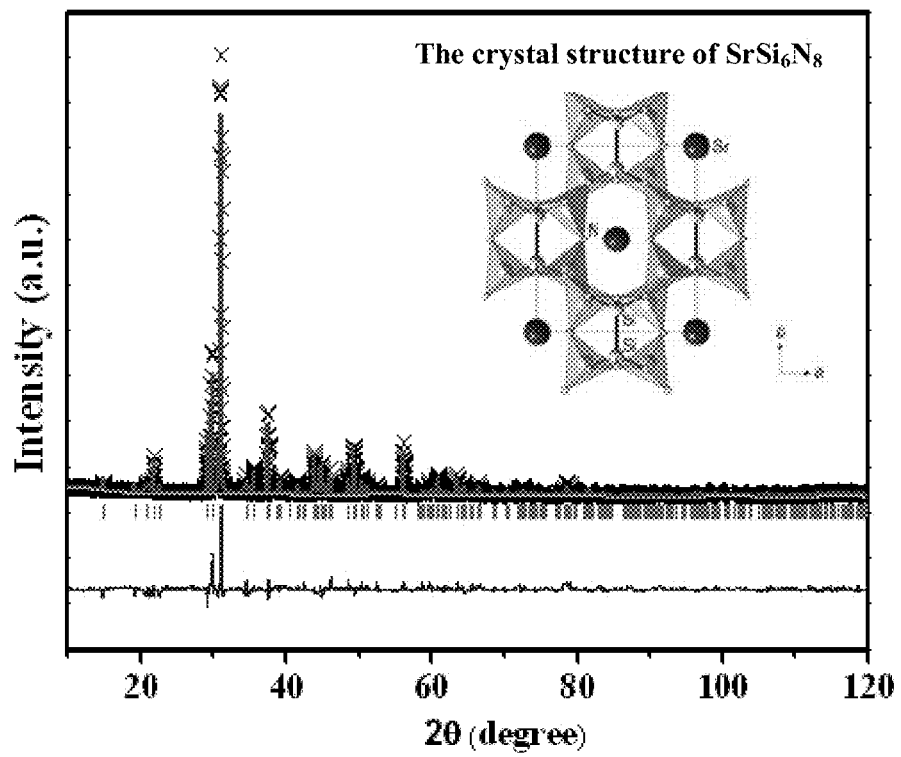
FIG. 1 is a Rietveld refinement of X-ray diffraction patterns and the crystal structure of $SrSi_6N_8$ powder mixtures synthesized by the method disclosed in the first embodiment of the present application.
Figure 2:
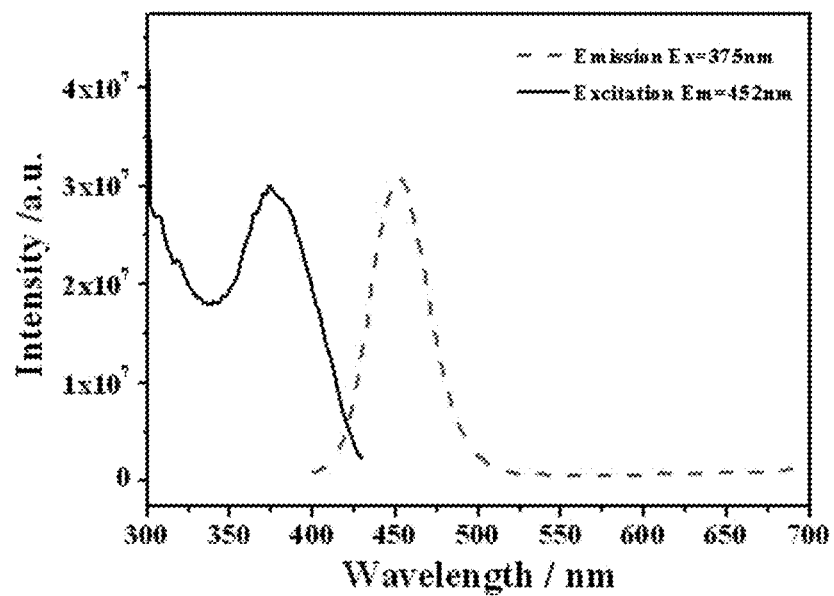
FIG. 2 is a Photoluminescence and absorption spectrum of $SrSi_6N_8$ powder mixtures synthesized by the method disclosed in the first embodiment of the present application.

The method for preparing the phosphor of $SrSi_6N_8$ comprises the following steps: First, a mixture comprising $Sr_3N_2$ and $Si_3N_4$ is provided. For example, the weight of $Sr_3N_2$ is 0.4848 g, and the weight of $Si_3N_4$ is 1.4029 g. The mixture is ground to form a powder mixture. Second, the powder mixture is sintered at a temperature of 1700-2300° C. for a time period of 2-4 hours under a pressure of 0.5-1.5 MPa of nitrogen (or inert gas) atmosphere. And preferably, the temperature for sintering the powder mixture is 1900° C., the pressure for sintering the powder mixture is 0.9 MPa, and the sintering time period is 3 hours. The nitrogen (or inert gas) atmosphere is provided so that no oxygen comes into reaction. FIG. 1 is a Rietveld refinement of X-ray diffraction patterns of the $SrSi_6N_8$ powder mixtures synthesized by the method disclosed in the embodiment. The result of Rietveld refinement shows a match with that of a standard sample of the single crystal $SrSi_6N_8$ shown at the upper right part. FIG. 2 is a photoluminescence and absorption spectrum of $SrSi_6N_8$ powder mixtures synthesized by the method disclosed in the embodiment. It shows the phosphor is capable of radiating a blue light under an excitation of UV light. The blue light (shown by the dotted curve marked as "Emission Ex=375 nm") comprises an emission spectrum with a peak wavelength between about 440 nm and about 470 nm, and FWHM from about 30 nm to about 50 nm. The UV light (shown by the solid curve marked as "Excitation Em=452 nm") comprises an emission spectrum with a peak wavelength between about 350 nm and about 390 nm.

Second Embodiment

$SrSi_6N_{7.95}O_{0.05}$ and its Preparation

According to the second embodiment of the present application, a phosphor of $SrSi_6N_{7.95}O_{0.05}$ is provided.

Figure 3:
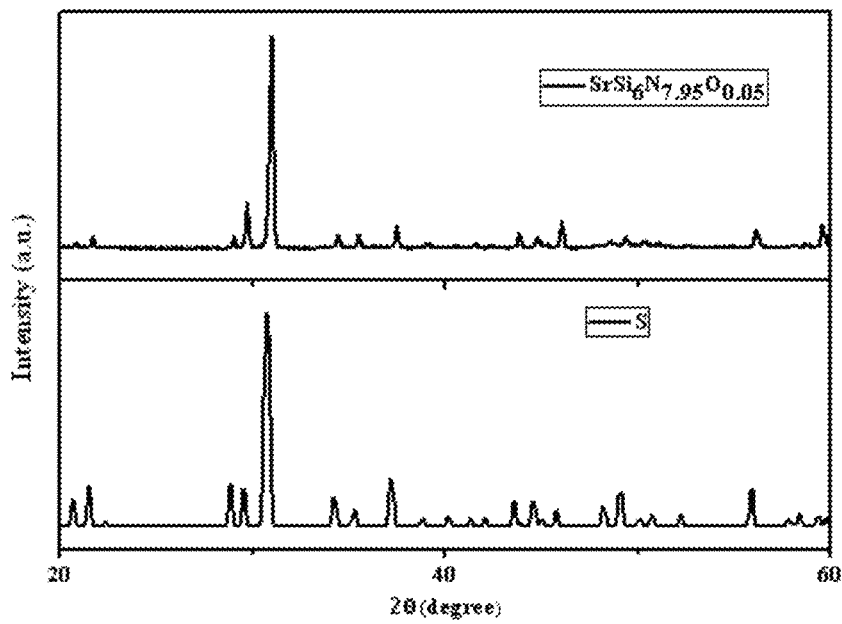
FIG. 3 is an X-ray powder diffraction pattern of $SrSi_6N_{7.95}O_{0.05}$ powder mixtures synthesized by the method disclosed in the second embodiment of the present application and the standard X-ray powder diffraction pattern of $SrSi_6N_8$.
Figure 4:
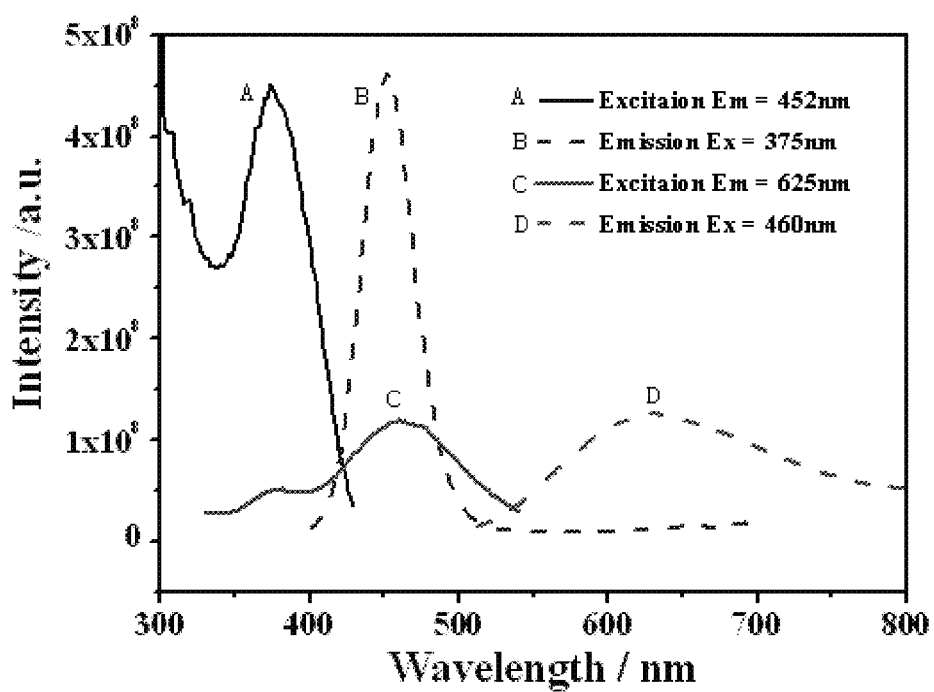
FIG. 4 is a Photoluminescence and absorption spectrum of $SrSi_6N_{7.95}O_{0.05}$ powder mixtures synthesized by the method disclosed in the second embodiment of the present application.

The method for preparing the phosphor of $SrSi_6N_{7.95}O_{0.05}$ comprises the following steps: First, a mixture comprising SrO, $Sr_3N_2$, and $Si_3N_4$ is provided. For example, the weight of SrO is 0.0259 g, the weight of $Sr_3N_2$ is 0.4606 g, and the weight of $Si_3N_4$ is 1.4029 g. The mixture is ground to form a powder mixture. Second, the powder mixture is sintered at a temperature of 1700-2300° C. for a time period of 2-4 hours under a pressure of 0.5-1.5 MPa of nitrogen atmosphere. And preferably, the temperature for sintering the powder mixture is 1900° C., the pressure for sintering the powder mixture is 0.9 MPa, and the sintering time period is 3 hours. The nitrogen (or inert gas) atmosphere is provided so that no oxygen comes into reaction. FIG. 3 is an X-ray powder diffraction pattern of the $SrSi_6N_{7.95}O_{0.05}$ powder mixtures synthesized by the method disclosed in the embodiment and the standard X-ray powder diffraction pattern of $SrSi_6N_8$. The upper part is the X-ray powder diffraction pattern of the $SrSi_6N_{7.95}O_{0.05}$ powder mixtures synthesized by the method disclosed in the embodiment. It shows a similarity to the standard pattern of $SrSi_6N_8$ shown at lower part marked with "—S". That means the $SrSi_6N_{7.95}O_{0.05}$ formed accordingly is a single-phase material and suggests that the composition of a very small amount of oxygen still makes the $SrSi_6N_{7.95}O_{0.05}$ have the same crystallization as that of $SrSi_6N_8$. FIG. 4 is a photoluminescence and absorption spectrum of $SrSi_6N_{7.95}O_{0.05}$ powder mixtures synthesized by the method disclosed in the embodiment. Like the first embodiment, it shows the phosphor is capable of radiating a blue light under an excitation of UV light. The blue light (shown by the dotted curve marked as "B Emission Ex=375 nm") comprises an emission spectrum with a peak wavelength between about 440 nm and about 470 nm and FWHM from about 30 nm to about 50 nm. The UV light (shown by the solid curve marked as "A Excitation Em=452 nm") comprises an emission spectrum with a peak wavelength between about 350 nm and about 390 nm. Besides, the phosphor is also capable of radiating a red light under an excitation of a blue light. The red light (shown by the dotted curve marked as "D Emission Ex=460 nm") comprises an emission spectrum with a peak wavelength between about 600 nm and about 650 nm and FWHM from about 150 nm to about 250 nm. The blue light (shown by the solid curve marked as "C Excitation Em=625 nm") comprises an emission spectrum with a peak wavelength between about 440 nm and about 470 nm.

Though the embodiments described above are illustrated by $SrSi_6N_8$ and $SrSi_6N_{7.95}O_{0.05}$, it is apparent that other alternatives, modifications and materials may be made to the embodiments without escaping the spirit and scope of the application, and a phosphor comprising a material having a general composition formula expressed by $M_1Si_6N_{8-X}O_X$ (satisfying $0 \leq x \leq 1$) is provided, where M is alkaline earth metal. And a preferable embodiment satisfies $0 \leq x \leq 0.1$.

What is claimed is:

1. A phosphor devoid of rare earth elements comprising a material having a general composition formula expressed by $M_1Si_6N_{8-X}O_X$ (satisfying $0 < x \leq 1$), wherein M is alkaline earth metal.

2. The phosphor as claimed in claim 1, wherein the phosphor is capable of radiating blue light when being excited by UV light.

3. The phosphor as claimed in claim 2, wherein the blue light comprises an emission spectrum with a peak wavelength between about 440 nm and about 470 nm.

4. The phosphor as claimed in claim 2, wherein the UV light comprises an emission spectrum with a peak wavelength between about 350 nm and about 390 nm.

5. The phosphor as claimed in claim 1, wherein the phosphor is capable of radiating red light when being excited by blue light.

6. The phosphor as claimed in claim 5, wherein the red light comprises an emission spectrum with a peak wavelength between about 600 nm and about 650 nm.

7. The phosphor as claimed in claim 5, wherein the blue light comprises an emission spectrum with a peak wavelength between about 440 nm and about 470 nm.

8. The phosphor as claimed in claim 1, wherein $0 < x \leq 0.1$.

9. A phosphor devoid of rare earth elements comprising a material having a composition expressed by $SrSi_6N_{7.95}O_{0.05}$.

10. A method for preparing a phosphor devoid of rare earth elements comprising the steps of:
providing a powder mixture comprising $Si_3N_4$ and at least one of $M_3N_2$ and MO; and
sintering the powder mixture to form the phosphor having a general composition formula expressed by $M_1Si_6N_{8-X}O_X$ (satisfying $0 < x \leq 1$), where M is alkaline earth metal.

11. The method for preparing a phosphor as claimed in claim 10, wherein the powder mixture comprises $Si_3N_4$, $M_3N_2$, and MO.

12. The method for preparing a phosphor as claimed in claim 10, wherein the temperature for sintering the powder mixture is between 1700 and 2300° C.

13. The method for preparing a phosphor as claimed in claim 10, wherein the time period for sintering the powder mixture is between 2 and 4 hours.

14. The method for preparing a phosphor as claimed in claim 10, wherein the pressure for sintering the powder mixture is between 0.5 and 1.5 MPa.

15. The method for preparing a phosphor as claimed in claim 10, wherein $0 < x \leq 0.1$.

16. A method for preparing a phosphor devoid of rare earth elements comprising the steps of:
providing a powder mixture comprising $Si_3N_4$ and at least one of $M_3N_2$ and MO; and
sintering the powder mixture to form the phosphor having a composition expressed by $SrSi_6N_{7.95}O_{0.05}$.

17. A phosphor devoid of rare earth elements consisting essentially of a material having a general composition formula expressed by $M_1Si_6N_{8-X}O_X$ (satisfying $0 < x \leq 1$), wherein M is alkaline earth metal.

18. A method for preparing a phosphor devoid of rare earth elements comprising the steps of:
providing a powder mixture comprising $Si_3N_4$ and at least one of $M_3N_2$ and MO; and
sintering the powder mixture to form the phosphor consisting essentially of a general composition formula expressed by $MISi_6N_{8-X}O_X$ (satisfying $0 < x \leq 1$), where M is alkaline earth metal.

* * * * *